United States Patent [19]
Heinrich et al.

[11] 4,069,012
[45] Jan. 17, 1978

[54] DYEING OF POLYESTER FABRIC WITH DISAZO DYE

[75] Inventors: Ernst Heinrich, Frankfurt am Main; Joachim Ribka, Offenbach (Main)-Burgel, both of Germany

[73] Assignee: Cassella Farbwerke Mainkur Aktiengesellschaft, Germany

[21] Appl. No.: 761,392

[22] Filed: Jan. 21, 1977

Related U.S. Application Data

[63] Continuation of Ser. No. 667,220, March 15, 1976, abandoned, which is a continuation of Ser. No. 560,618, March 21, 1975, abandoned.

[30] Foreign Application Priority Data

Mar. 26, 1974 Germany .............................. 2414477
Dec. 21, 1974 Germany .............................. 2460775

[51] Int. Cl.² ...................... C09B 27/00; C09B 31/02
[52] U.S. Cl. ........................................ 8/41 C; 8/179; 260/174; 260/186
[58] Field of Search .................. 8/41 C; 260/186, 174

[56] References Cited

U.S. PATENT DOCUMENTS

| | | | |
|---|---|---|---|
| 2,044,082 | 6/1936 | Knight | 260/84 |
| 2,196,984 | 4/1940 | Ellis et al. | 8/48 |
| 3,523,936 | 8/1970 | Toji | 260/187 |
| 3,549,305 | 12/1970 | Renfrew et al. | 8/41 |

FOREIGN PATENT DOCUMENTS 533,439  2/1941  United Kingdom.

*Primary Examiner*—A. Lionel Clingman
*Attorney, Agent, or Firm*—Connolly and Hutz

[57] ABSTRACT

Polyester fabrics are particularly effectively dyed with water-insoluble dyes having the formula:

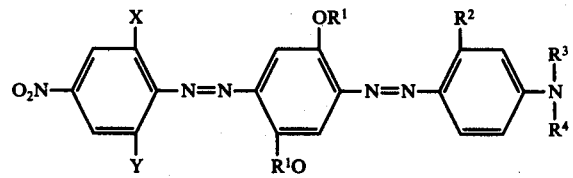

13 Claims, No Drawings

DYEING OF POLYESTER FABRIC WITH DISAZO DYE

CROSS-REFERENCE TO RELATED APPLICATIONS

This application is a continuation of application Ser. No. 667,220 filed Mar. 15, 1976 and now abandoned which, in turn, is a continuation of application Ser. No. 560,618 filed Mar. 21, 1975 and now abandoned.

The present invention relates to the dyeing of polyester fabrics, such as those made from polyethylene terephthalate fibers. Cellulose esters are dyed according to U.S. Pat. No. 2,044,082 (ICI), U.S. Pat. No. 2,196,984 (Celanese) using disazo-dyestuffs of the formula

wherein C represents a p-aminophenyl radical which is substituted on the amino group by at least one hydroxyalkyl group and D and M represent phenyl and phenylene radicals, respectively which may be substituted by non-water-solubilizing substituents. Polyester fabrics are dyed according to U.S. Pat. No. 3,549,305 using disazo dyestuffs of the formula

wherein C represents a p-aminophenyl radical which is substituted on the aminogroups by two alkanoyloxyalkyl groups and D and M have the meanings given above. From British patent specification No. 533,439 (Celanese) a process is known for the coloration of Cellulose esters, which comprises forming an azo dye within the fiber by impregnating the fiber material with an aminoazo compound, e. g. of the formula

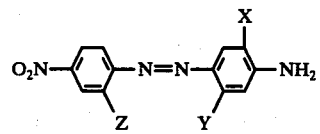

wherein X represents hydrogen, alkoxy, alkyl or halogen and Y and Z represent alkyl, alkoxy or acidyl amino, washing the impregnated fiber, diazotizing the aminoazo compound by treating the fiber with an acid aqueous solution of sodium nitrite, washing again the fiber and subsequently treating the fiber with a dispersion of an N-substituted m-aminophenol ether in which the amino group is substituted by one or two hydrocarbon radicals.

Among the objects of the present invention is the improved dyeing of polyester fabrics, or of the fibers or foils from which they are made, as well as novel dyes for that purpose.

The foregoing as well as additional objects of the present invention are more fully set out in the following description of several of its exemplifications.

According to the present invention polyester fabric is dyed with a dye bath or dye printing paste containing one or more dyes having the formula

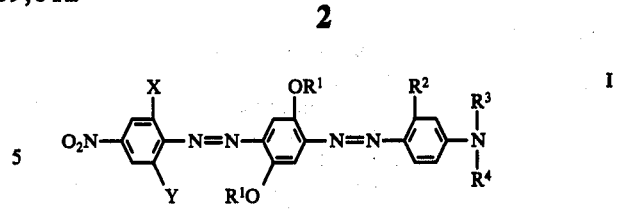

wherein $R^1$, $R^3$ and $R^4$ can be the same or different lower alkyl or lower alkenyl, $R^2$ is hydrogen, halogen, lower alkyl, lower alkoxy or lower alkenoxy, X is hydrogen, chlorine, bromine, nitrile or nitro, and Y is hydrogen, chlorine or bromine. The preferred lower alkyl, lower alkenyl and lower alkoxy and lower alkenoxy groups each have up to four carbon atoms.

The foregoing dyes are insoluble in water, and when applied by conventional techniques, as generally referred to in U.S. Pat. Nos. 3,845,034 and 3,772,267, generally give particularly good dyeing, strong colors of especially good fastness to light and heat. Such dyes can be mixed together for simultaneous dyeing.

The preferred fibers dyed pursuant to the present invention are polyethylene terephthalate fibers, but any polyester fiber, such as polybutylene terephthalate, polyethylene-5-sulfo-isophthalate and 1,4-dimethylolcyclohexane terephthalate is also suitable for the dyeing of this invention.

Particularly valuable in connection with the present invention are dyes having the formulae

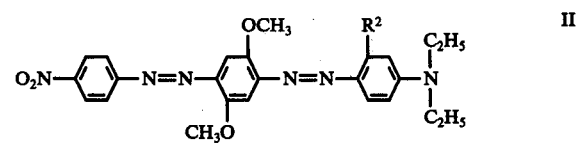

wherein $R^2$ is hydrogen or methyl or methoxy, as well as

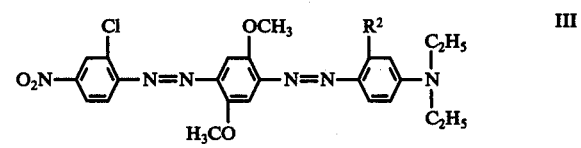

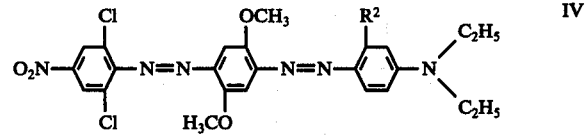

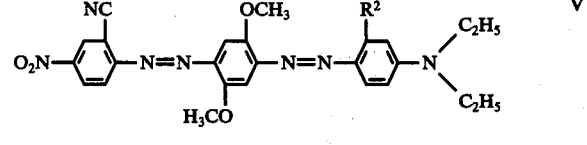

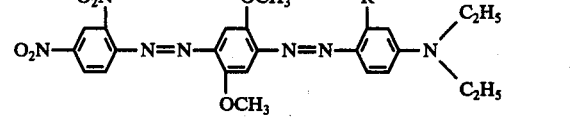

wherein $R^2$ is hydrogen, methyl or methoxy.

The fabrics dyed in accordance with the present invention have their fibers in the form of filaments or twisted or untwisted films, and can be knitted, woven or non-woven textiles, rope, combed or uncombed yarn or thread, skeins, spools or batts.

The dyestuffs of the present invention are insoluble in water. They are most readily utilized in the form of aqueous dispersions whereby they are present in a fine division with particle sizes of 0.1 to 10 $\mu$, and preferably 0.5 to 2 $\mu$. These are obtained by mixing the dyestuffs together with liquids, preferably water, and disintegrating the mixed dye particles, optionally in the presence of suitable dispersing agents.

Suitable dispersing agents are anion-active, examples being lignin sulfonates, alkyl or alkylaryl sulfonates or alkylarylpolyglycol ether sulfonates.

The dye particle disintegration is preferably effected mechanically by milling in suitable aggregates such as ball, bead or sand mills, roll mills, grinding or impact mills or attrition devices.

The dyestuff dispersions are preferably pourable for most of the specific embodiments of the present invention. The dyestuff and dispersing agent content is limited, therefore, in these instances. Generally, the dispersions are standardized to a dyestuff content of up to 30% by weight and a dispersing agent content of up to about 25%. For economic reasons dyestuff contents usually do not fall below 15% by weight.

The dispersions may also contain further auxiliary agents such as fungicides, as for example sodium-o-phenylphenolate and sodium pentachlorophenolate.

The dyestuff dispersions thus obtained may be employed advantageously for the standard of printing pastes and dye baths used according to the present invention. Special advantages are obtained this way in the continuous processes, for example, wherein the dyestuff concentration of the dye baths is maintained substantially constant by continuous dyestuff feeding into the running apparatus.

For certain specific embodiments of the novel process, e.g. in the charging operation, in the introduction of the dyestuff for tinting or in the use under special climatic conditions, powder standardizations are preferred since their technical properties do not change over long periods of time. These powders contain the dyestuff, dispersing agents and other auxiliary agents such as wetting, oxidation, preserving and dust-arresting agents. Such powder standardizations are redispersible, i.e. with a simple stirring into a liquid medium, preferably water, they yield stable dyestuff dispersions wherein the dyestuff particles have the above-stated size.

A preferred method of preparation for the pulverulent dyestuff consists of removing the liquid from the above-described liquid dyestuff dispersions. This removal may be carried out by means of all methods suitable for this purpose such as vacuum drying, freeze drying, drying on roller dryers, but preferably by spray drying.

For the preparation of the aqueous dye liquors to be used according to the invention, the required amounts of the liquid or solid dyestuff standardizations are thinned with water to such an extent that a dye-to-liquor ratio of 1:5 to 1:50 results. In addition, further dyeing auxiliary agents such as dispersing, wetting and padding agents are generally added to the liquors. As the wetting and dispersing agents for the preparation of the liquors, the following are considered: reaction products of alkylene oxides, such as ethylene or propylene oxide, with alkylatable compounds, such as fatty alcohols, fatty amines, fatty acids, phenols, alkylphenols, aromatic or aliphatic carboxylic acid amides or lignin sulfonates, alkyl or alkylaryl sulfonates or alkylaryl polyglycol ether sulfonates.

The preferred auxiliary padding agents are polymeric acrylic acid derivatives, such as polyacrylamides with a K value of about 120. The above-mentioned auxiliary agents are preferably employed in quantities of 0.2 to 5% by weight, referring to the total weight of the dye liquor or printing paste.

The amount of dyestuff used varies depending on the circumstances, such as the required dye speed, the fiber structure, the color type, and the desired depth of color. However, preferable dyestuff quantities are up to 5% of the fiber weight.

For standard use of a weakly acid pH value, organic acids may be added such as lower aliphatic carboxylic acids, examples of which are formic acid or acetic acid. For standardization of an alkaline pH value, alkali hydrogen carbonate, such as sodium or potassium hydrogen carbonate, is preferably used. The dyeing may take place in various manners including the carrier process, the HT process and the thermosol process.

In the carrier process the material to be dyed with a dye liquor, which is obtained as described above, is treated at 95°–105° C in the presence of up to 2% by weight, referring to the quantity of liquor, of a carrier, i.e. a fixing agent, until the main quantity of dyestuff has gone on the material to be dyed. The time required for this purpose is adjusted to the circumstances of the particular case, such as the type of dyestuff, the fibers and the carrier, and fluctuates preferably within the limits of 15 – 120 minutes. Known carriers which may be used in this manner are, for example: phenylphenols, halogenated benzenes and salicylic acid esters.

In the HT process the goods to be dyed are treated with a dye liquor which contains no carrier but otherwise is prepared as described above, in pressure-resistant dyeing containers under the vapor pressure of the dye liquor at 120°–140° C, for 15 to 120 minutes and preferably 15 to 60 minutes.

In the thermosol process the goods to be dyed are padded with the dye liquor and optionally after an intermediate drying, are conducted over heated rollers or through a hot air or vapor stream, the dyestuff being fixed in the fibers at temperatures of 180° – 220° C chiefly.

For printing on fibrics the dyes are preferably compounded in printing pastes containing the required quantities of the liquid or redispersible solid dyestuff standard formulation together with thickening agents, such as alkali alginates, carob bean flour, starch, tragacanth or even inorganic gels, and optionally further additives such as organic acids, alkali, fixing accelerators, wetting agents and oxidation agents. Considered chiefly as organic acids are monobasic or multibasic aliphatic carboxylic acids, such as formic acid, acetic acid, propionic acid, oxalic acid, or particularly advantageously tartaric or citric acid. As the alkali, sodium and potassium hydrogen carbonate are preferred. Nitrobenzene derivatives, such as m-nitrobenzene sulfonic acid, for example, are employed advantageously for oxidants. The thickening agents are added to the printing pastes normally in quantities of 40 – 60 g per kg printing paste, fixing accelerator and wetting agent in quantities of 5 to 50 g per kg printing paste, and oxidation agent in quantities of up to 10 g per kg printing paste.

The textile goods are printed with these printing pastes and optionally after an intermediate drying conducted over heated rollers or through a stream of heated air or superheated vapor, the fixing of the dyestuff setting in the fiber. The operation here proceeds preferably at air or roller temperatures of 150° – 220° C or at vapor temperatures of 120° – 160° C.

The dyed or printed goods are washed with water, optionally in the presence of a wetting agent, and dried. A reductive after-treatment with 0.2% alkaline sodium dithionite solution may take place for 15 minutes at 60° – 90° C after the washing. Subsequently it is then again washed with water and dried.

A further specific embodiment of the dyeing process of the present invention applied the dyestuffs of Formula I to the fabrics to be dyed while the dyestuffs are dispersed in organic solvents. Dye liquors so made generally contain over 80% by weight of an organic solvent.

Suitable organic solvents for this purpose normally have a boiling point of 25° to 150° C, and preferably 40° to 150° C. Examples for such organic solvents are, for example, aliphatic hydrocarbons such as benzines, aliphatic hydrocarbon halides such as methylene chloride, dichloroethane, trichloroethane, tetrachloroethane, dichlorofluoromethane, dichlorotetrafluoroethane and octafluorocyclobutane, aromatic hydrocarbons such as toluene and xylene, and aromatic hydrocarbon halides such as chlorobenzene, benzotrifluoride and fluorobenzene. Particularly suitable are trichlorofluoromethane, 1,2,2-trichloro-1,1,2-trifluoroethane, tetrachloroethylene, trichloroethylene and 1,1,1-trichloroethane.

Particularly interesting as organic solvents are the lower alcohols, preferably aliphatic alcohols with 1 to 4 carbon atoms. Mixtures of various solvents are often advantageous; particularly suitable, for example, are mixtures of halogenated aliphatic hydrocarbons and aliphatic alcohols.

For the preparation of the dye liquors the dyestuffs are dissolved in the organic solvent or in the solvent mixture by stirring, optionally with the help of heating. The dyestuffs may be added in various forms, e.g. in a diluent-free form, or as a concentrated solution in an organic solvent or solvent mixture or in a prepared form using solvent-soluble auxiliary agents such as ethoxylated derivatives of fatty alcohols, alkyl phenols, fatty acids and fatty acid amides. The liquid and pulverulent dyestuff standardizations employed for the preparation of aqueous dye liquors may also be added to the organic solvents.

The dye liquors based on organic solvents may also contain up to 10% water. This additive can considerably favor the dye absorption by the fabrics being dyed.

The dyeing of fabrics in liquors based on organic solvents may take place in various ways.

Thus the fabrics padded with the dye liquors are heated at normal or elevated pressure to temperatures which are between the normal boiling point of the dye liquor and preferably 140° C until the main portion of the dyestuff is absorbed on the fabric's fibers.

For this purpose different dyeing times may be used, depending on the circumstances of the particular case, such as the type of dyestuff, the fibers and selected temperature. In view of the manageability of the dyeing process on the one hand and efficiency on the other hand, dyeing times of 15–120 minutes are preferred.

The dyeing can be carried out continuously, in which event textile materials may be impregnated with the dye liquors and subsequently, optionally after an intermediate drying, are subjected to a suitable fixing process.

The application of the dye liquors to textile materials takes place most suitably by padding but may also take place by other impregnation processes such as spraying, dipping and the like. The application of the dye liquor as by impregnation is preferably at room temperature, but it is possible to work at lower or higher temperatures.

The textile treated with the dye liquor is preferably dried prior to the dyestuff fixing, Drying may be, for example, by warm air, by the forcing through of an inert gas (such as nitrogen) or air, or by using superheated vapors, such as water vapor or solvent vapor, or by the use of vacuum.

The dyestuffs can then be fixed by the use of elevated temperatures, e.g. by hot air, dry heat, or water or solvent vapor. The fixing temperatures depend on the fiber and generally are between 100° and 240° C. The heat treatment may take place in superheated water vapor or in vapors of organic solvents, in molten metals, paraffins or other waxes, ethoxylated derivatives of alchols or fatty acids, or in eutectic salt mixtures. However, preferred is the fixing by dry heat, i.e. in accordance with the so-called thermosol process.

It is also possible to effect drying and heat treatment in one operation. The solvent vapors evolved in drying or fixing can be reclaimed in suitable apparatus, and the solvents thus recovered may then be used again for the preparation of new dye liquors.

The dyeing of the present invention may also take place by circulating a dye solvent through a quantity of the dyestuff and subsequently into contact with the fabrics, where the dyestuff is released from the deposit and absorbed by the fabric. The solvent can then be recycled back to dyestuff.

After fixing of the dyestuffs, the unfixed dyestuff portion is optionally removed by a suitable post-treatment, inasmuch as this increases the service fastnesses of the dyeing. This post-treatment is preferably carried out in the same organic solvent used for dyeing but may also take place in other organic solvents or in aqueous liquors.

Features of the present invention are that deep blue-violet to blue-gray dyeings and prints are obtained with very good coloristic properties, such as color strength, build-up capacity, particularly good fastness to light and sublimation, high pH stability, and very good fastness to wet processing, particularly in the 95° C wash, in the peroxide wash, in the chlorine wash, good resistance to alkaline and acid prespiration, fastnesses to solvents and to dry cleaning, to nitric oxide and exhaust gas, boiling soda, peroxide bleach and hypochlorite, both light and heavy.

In the dyeing and printing of blends of polyesters with wool or cotton, the natural fibers are only slightly colored by the dyes of the present invention. With respect to these properties, dyeings and prints obtained according to this invention are clearly superior to those obtained according to what is known from the references cited above.

The dyestuffs of the present invention are easily prepared from p-nitro-p$^1$-aminoazobenzenes of the Formula

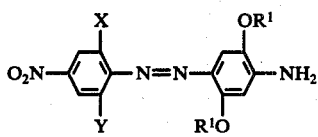

which in turn are prepared as described in U.S. Pat. No. 3,845,034. The nitro-aminoazobenzene is diazotized and the diazonium compound obtained is coupled to an aniline derivative of the Formula

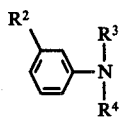

wherein radicals X, Y and $R^1$ through $R^4$ have the above-stated meanings.

The diazotation of the aminoazobenzenes of Formula VII takes place in the conventional manner by the action of nitrous acid or of compounds that form nitrous acid. For example the nitro-aminoazobenzenes may be dissolved in sulfuric acid or in lower aliphatic carboxylic acids, such as acetic acid or propionic acid, for example, and diazotized at 0° to 30° C by the addition of nitrosyl sulfuric acid. The coupling is carried out in an acid, aqueous medium at temperatures of 0° to 30° C, preferably 0° to 5° C. For a completion of the coupling reaction it may be suitable to buffer the pH value of the coupling deposit toward the end of the reaction by the addition of alkali, such as sodium acetate, to a value of 5.

It should be again pointed out that mixtures of the dyestuffs of the present invention sometimes offer advantages, e.g. they give a better dye yield than the individual dyestuffs.

EXAMPLE 1

Stirred into 2000 g water is 1.0 g of the finely dispersed dyestuff of the formula

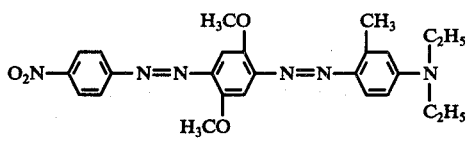

It is standardized with acetic acid to a pH value of 5-6 and mixed with 4.0 g of ammonium sulfate and 2.0 g of a commercial naphthalene sulfonic acid-formaldehyde condensate dispersing agent.

Into the dye liquor thus obtained are introduced 100 g of a plyethylene terephthalate fabric, and it is dyed 1 hour at 130° C. Then after washing, reductive post-treatment with a 0.2% alkaline sodium dithionite solution for 15 minutes at 70°–80° C, another washing and finally a drying, there is obtained a deep blue dyed product with very good color properties, particularly a very good fastness to light and to heat. Using polybutylene-terephthalate fabric instead of polyethylene terephthalate fabric, there is obtained a dyeing having similar shades and fastness properties.

The dyestuff employed in this example was prepared as follows:

30.2 g of 2,5-dimethoxy-4-amino-4'-nitro-1,1'-azobenzene are diazotized in 150 g acetic acid with 34.2 g of 41.3% nitrosyl sulfuric acid with external cooling to +15° C, and introduced into a solution of 19.6 g 3-N,N-diethylaminotoluene in 400 g water and 27.6 g technical hydrochloric acid (D = 1.15). The reaction temperature is maintained during the coupling at 0° to +5° C by the addition of ca. 500 g ice. After a 1 hour stirring a solution of 136 g sodium acetate in 250 g water is run in for the completion of the coupling. The resulting dyestuff is filtered off upon completion of the coupling, washed with water and dried. It is suitably purified by recrystallization from n-butanol and is a blackish powder which dissolves to a blue color in concentrated sulfuric acid.

EXAMPLE 2

A polyethylene terephthalate fabric is padded at 30° C on a pad with a liquor which contains 30.0 g of the finely divided dyestuff of the formula

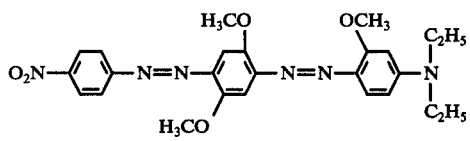

1.0 g polyacrylamide having a K value of 120, 0.5 g of a polyglycol ether of oleyl alcohol having 16 ethylene oxide moieties per mol, and 968.5 g water. The fabric is then dried and fixed for 60 seconds at 210° C in a thermofixing frame. After a subsequent washing and finishing, as described in Example 1, there is obtained a blue dyeing having very good fastness properties.

The dyestuff is prepared in accordance with the data in Example 1 by the use of 21.5 g 3-N,N-diethylaminoanisole in the coupling. It is suitably purified by recrystallization from n-butanol and is a blackish powder which dissolves to a blue color in concentrated sulfuric acid.

EXAMPLE 3

30.0 g of the dyestuff of the formula

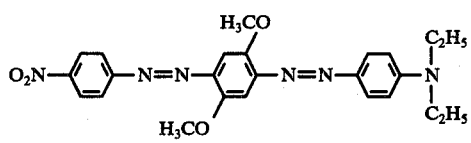

are incorporated in a fine division into a printing paste which contains 45.0 g carob bean flour, 6.0 g 3-nitrobenzene sulfonic acid sodium, and 3.0 g citric acid per 1000 g. After printing with this paste, then drying and fixing in the thermofixing frame for 45 seconds at 215° C, washing and finishing, as described in Example 1, there is obtained on a polyester fabric a deep blue-gray print having very good color properties, particularly a very good fastness to light and heat.

The dyestuff employed may be prepared in accordance with the data in Example 1 by the use of 17.9 g N,N-diethylaniline in the coupling. It is suitably purified by recrystallization from n-butanol, and is a blackish powder which dissolves to a reddish-brown color in concentrated sulfuric acid.

EXAMPLE 4

1.0 g of the finely dispersed dyestuff of the formula

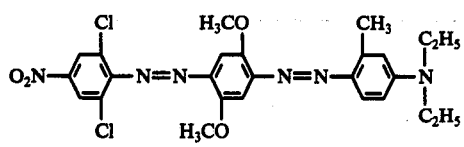

is stirred into 2000 g water. It is standardized with acetic acid to a pH value of 5-6 and mixed with 4.0 g ammonium sulfate and 2.0 g of a commercial naphthalene sulfonic acid formaldehyde condensate dispersing agent. Into the dye liquor thus obtained 100 g of a polyethylene terephthalate fabric are introduced and dyed 1 hour at 130° C.

After a subsequent washing, reductive post-treatment with an 0.2% alkaline sodium dithionite solution for 15 minutes at 70°-80° C, another washing and finally a drying, there is obtained a blue-violet dyeing with very good color properties, particularly a very good fastness to light and heat.

The dyestuff used in this example is prepared as follows:

37.0 g 2,5-dimethoxy-4-amino-2',6'-dichloro-4'-nitro-1,1'-azobenzene are diazotized at 15° C in 150 g acetic acid with 34.2 g of 41.3% nitrosyl sulfuric acid with external cooling, and introduced into a solution of 19.6 g 3-N,N-diethylaminotoluene in 400 g water and 27.6 g technical hydrochloric acid (D = 1.15). The reaction temperature during the coupling is maintained at 0° to 5° C by the addition of ca. 500 g ice. After a 1 hour stirring a solution of 136 g sodium acetate in 250 g water is allowed to run in. The resulting dyestuff is filtered off upon completion of the coupling, washed with water and dried. It is suitably purified by recrystallization from n-butanol and is a blackish powder which dissolves to a blue-violet color in concentrated sulfuric acid.

EXAMPLE 5

A fabric of polyethylene terephthalate is padded at 30° C on the pad with a liquor which contains 30.0 g of the finely divided dyestuff of the formula

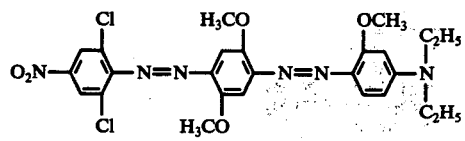

1.0 g of polyacrylamide having a K value of 120, 0.5 g of a polyglycol ether of oleyl alcohol having twenty ethylene oxide moieties per mol, and 968.5 g water. The fabric is then dried and fixed for 60 seconds at 210° C in a thermofixing frame. After a subsequent washing and finishing as described in Example 1, there is obtained a blue-gray dyeing having very good fastness properties.

The dyestuff is prepared in accordance with the data of Example 4 by the use of 21.5 g of 3-N,N-diethylaminoanisole in the coupling. It is suitably purified by recrystallization from n-butanol and is a blackish powder which dissolves to a blue-violet color in concentrated sulfuric acid.

EXAMPLE 6

30.0 g of the dyestuff of the formula

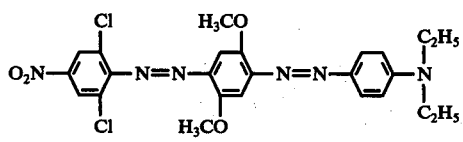

are incorporated in a fine division into a printing paste which contains 45.0 g carob bean flour, 6.0 g 3-nitrobenzene sulfonic acid sodium, and 3.0 g citric acid per 1000 g. After printing, drying and fixing in the thermofixing frame for 45 seconds at 215° C, washing and finishing as described in Example 1, there is obtained with this printing paste on a polyester fabric a deep blue-gray print having very good color properties, particularly a very good fastness to light and heat.

The dyestuff employed may be prepared in accordance with the data in Example 4 by the use of 17.9 g N,N-diethylaniline in the coupling. It is suitably purified by recrystallization from n-butanol and is a balckish powder which dissolves to a blue-violet color in concentrated sulfuric acid.

EXAMPLE 7

100 g polyester material are treated for 30 minutes at 121° C in 1500 g ethylene tetrachloride in which 2.0g of the dyestuff described in Example 3 had been dissolved. The dyed fabric is washed with warm and cold ethylene tetrachloride, and a full blue-gray dyeing having very good color properties is obtained.

EXAMPLE 8

The procedure of Example 7 is repeated but the dyestuff used is 2.0 g of the dyestuff described in Example 6. There is obtained an equally full blue-gray dyeing having very good color properties.

The following table indicates further dyestuffs usuable according to the invention, which on polyester materials yield equally deep blue to gray dyeings or prints with equally good color properties. This table lists species under the generic formula.

TABLE

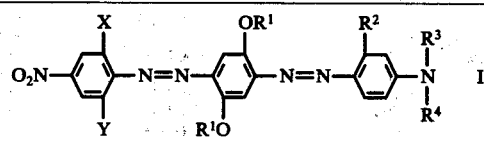

| | X | Y | $R^1$ | $R^2$ | $R^3$ | $R^4$ |
|---|---|---|---|---|---|---|
| 1. | —H | —H | —$CH_3$ | —H | —$CH_3$ | —$CH_3$ |
| 2. | —H | —H | —$CH_3$ | —H | —$CH_3$ | —$C_2H_5$ |
| 3. | —H | —H | —$CH_3$ | —H | —$C_3H_7(n)$ | —$C_3H_7(n)$ |
| 4. | —H | —H | —$CH_3$ | —H | —$C_2H_5$ | —$C_3H_7(n)$ |
| 5. | —H | —H | —$CH_3$ | —H | —$C_2H_5$ | —$C_3H_7(iso)$ |
| 6. | —H | —H | —$CH_3$ | —H | —$CH_2$—$CH$=$CH_2$ | —$CH_2$—$CH$=$CH_2$ |
| 7. | —H | —H | —$CH_3$ | —H | —$C_2H_5$ | —$CH_2$—$CH$=$CH_2$ |
| 8. | —H | —H | —$CH_3$ | —H | —$C_4H_9(n)$ | —$C_4H_9(n)$ |

TABLE-continued

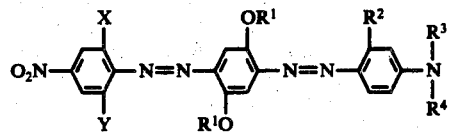

| | X | Y | R¹ | R² | R³ | R⁴ |
|---|---|---|---|---|---|---|
| 9. | —H | —H | —CH₃ | —H | —C₂H₅ | —C₄H₉(iso) |
| 10. | —H | —H | —CH₃ | —H | —C₂H₅ | —C₄H₉(tert.) |
| 11. | —H | —H | —CH₃ | —H | —CH₃ | —CH₂—C(CH₃)=CH₂ |
| 12. | —H | —H | —CH₃ | —H | —CH₃ | —CH₂—CH=CH—CH₃ |
| 13. | —H | —H | —C₂H₅ | —H | —C₂H₅ | —C₂H₅ |
| 14. | —H | —H | —CH=CH₂ | —H | —C₃H₇(n) | —C₃H₇(n) |
| 15. | —H | —H | —C₄H₉(n) | —H | —CH₃ | —CH₃ |
| 16. | —H | —H | —CH₃ | —Cl | —CH₃ | —CH₃ |
| 17. | —H | —H | —CH₃ | —Cl | —C₂H₅ | —C₂H₅ |
| 18. | —H | —H | —CH₃ | —CH₃ | —CH₃ | —CH₃ |
| 19. | —H | —H | —C₂H₅ | —CH₃ | —CH₃ | —CH₃ |
| 20. | —H | —H | —CH₃ | —CH₃ | —CH₃ | —C₂H₅ |
| 21. | —H | —H | —CH₃ | —CH₃ | —C₃H₇(n) | —C₃H₇(n) |
| 22. | —H | —H | —CH₃ | —CH₃ | —C₂H₅ | —C₃H₇(iso) |
| 23. | —H | —H | —CH₃ | —CH₃ | —C₂H₅ | —CH₂—CH=CH₂ |
| 24. | —H | —H | —CH₃ | —CH₃ | —C₄H₉(n) | —C₄H₉(n) |
| 25. | —H | —H | —CH₃ | —CH₃ | —CH₃ | —C₄H₉(iso) |
| 26. | —H | —H | —C₃H₇(n) | —CH₃ | —C₂H₅ | —C₂H₅ |
| 27. | —H | —H | —C₃H₇(iso) | —CH₃ | —C₂H₅ | —C₂H₅ |
| 28. | —H | —H | —CH₃ | —C₂H₅ | —CH₃ | —CH₃ |
| 29. | —H | —H | —CH₃ | —C₂H₅ | —C₂H₅ | —C₂H₅ |
| 30. | —H | —H | —C₂H₅ | —C₄H₉(n) | —C₂H₅ | —C₂H₅ |
| 31. | —H | —H | —CH₃ | —OCH₃ | —CH₃ | —CH₂—CH₃ |
| 32. | —H | —H | —CH₃ | —OCH₂—CH=CH₂ | —C₂H₅ | —C₂H₅ |
| 33. | —H | —H | —C₂H₅ | —Cl | —C₂H₅ | —CH₂—C(CH₃)=CH₂ |
| 34. | —H | —H | —CH₃ | —OCH₃ | —CH₃ | —CH₃ |
| 35. | —H | —H | —CH₃ | —OCH₃ | —CH₃ | —C₂H₅ |
| 36. | —H | —H | —CH₃ | —OC₂H₅ | —C₂H₅ | —C₂H₅ |
| 37. | —H | —H | —C₂H₅ | —OC₂H₅ | —C₂H₅ | —C₂H₅ |
| 38. | —H | —H | —CH₃ | —OC₃H₇(iso) | —CH₃ | —CH₃ |
| 39. | —H | —H | —CH₃ | —OC₄H₉(n) | —C₂H₅ | —C₂H₅ |
| 40. | —H | —H | —C₄H₉(sec.) | —OCH₃ | —CH₃ | —CH₃ |
| 41. | —H | —H | —CH₃ | —OCH₃ | —C₂H₅ | —CH₂—CH=CH₂ |
| 42. | —H | —H | —CH₃ | —OCH₃ | —C₂H₅ | —C₄H₉(iso) |
| 43. | —H | —H | —CH₃ | —O—CH₂—CH=CH₂ | —C₂H₅ | —C₂H₅ |
| 44. | —H | —H | —C₂H₅ | —O—CH₂—CH=CH₂ | —CH₃ | —CH₃ |
| 45. | —Br | —Br | —CH₃ | —H | —CH₃ | —CH₃ |
| 46. | —Br | —Br | —CH₃ | —H | —CH₃ | —C₂H₅ |
| 47. | —Cl | —H | —CH₃ | —H | —C₃H₇(n) | —C₃H₇(n) |
| 48. | —Cl | —Br | —CH₃ | —H | —C₂H₅ | —C₃H₇(n) |
| 49. | —Cl | —Br | —CH₃ | —H | —C₂H₅ | —C₃H₇(iso) |
| 50. | —Cl | —H | —CH₃ | —H | —CH₂—CH=CH₂ | —CH₂—CH=CH₂ |
| 51. | —Cl | —H | —CH₃ | —H | —C₂H₅ | —CH₂—CH=CH₂ |
| 52. | —Cl | —Cl | —CH₃ | —H | —C₄H₉(n) | —C₄H₉(n) |
| 53. | —Cl | —Br | —CH₃ | —H | —C₂H₅ | —C₄H₉(iso) |
| 54. | —Cl | —Br | —CH₃ | —H | —C₂H₅ | —C₄H₉(tert.) |
| 55. | —Cl | —H | —CH₃ | —H | —CH₃ | —CH₂—C(CH₃)=CH₂ |
| 56. | —Cl | —H | —CH₃ | —H | —CH₃ | —CH₂—CH=CH—CH₃ |
| 57. | —Cl | —Cl | —C₂H₅ | —H | —C₂H₅ | —C₂H₅ |
| 58. | —Cl | —Cl | —CH=CH₂ | —H | —C₃H₇(n) | —C₃H₇(n) |
| 59. | —Cl | —H | —C₄H₉(n) | —H | —CH₃ | —CH₃ |
| 60. | —Cl | —Cl | —CH₃ | —Cl | —CH₃ | —CH₃ |
| 61. | —Cl | —H | —CH₃ | —Cl | —C₂H₅ | —C₂H₅ |
| 62. | —Br | —Br | —CH₃ | —CH₃ | —CH₃ | —CH₃ |
| 63. | —Br | —Br | —C₂H₅ | —CH₃ | —CH₃ | —CH₃ |
| 64. | —Cl | —H | —CH₃ | —CH₃ | —CH₃ | —C₂H₅ |
| 65. | —Cl | —Cl | —CH₃ | —CH₃ | —C₃H₇(n) | —C₃H₇(n) |
| 66. | —Cl | —Br | —CH₃ | —CH₃ | —C₂H₅ | —C₃H₇(iso) |
| 67. | —Cl | —Br | —CH₃ | —CH₃ | —C₂H₅ | —CH₂—CH=CH₂ |
| 68. | —Cl | —H | —CH₃ | —CH₃ | —C₄H₉(n) | —C₄H₉(n) |
| 69. | —Cl | —H | —CH₃ | —CH₃ | —CH₃ | —C₄H₉(iso) |
| 70. | —Cl | —Cl | —C₃H₇(n) | —CH₃ | —C₂H₅ | —C₂H₅ |
| 71. | —Cl | —Cl | —C₃H₇(iso) | —CH₃ | —C₂H₅ | —C₂H₅ |
| 72. | —Br | —Br | —CH₃ | —C₂H₅ | —CH₃ | —CH₃ |
| 73. | —Cl | —Cl | —CH₃ | —C₂H₅ | —C₂H₅ | —C₂H₅ |
| 74. | —Cl | —H | —C₂H₅ | —C₄H₉(n) | —C₂H₅ | —C₂H₅ |

TABLE-continued

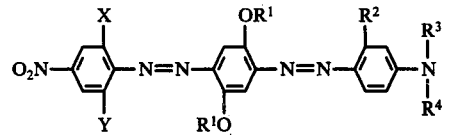

| | X | Y | R¹ | R² | R³ | R⁴ |
|---|---|---|---|---|---|---|
| 75. | —Cl | —Br | —CH₃ | —OCH₃ | —CH₃ | —CH₂—CH₃ |
| 76. | —Cl | —Cl | —CH₃ | —OCH₂—CH=CH₂ | —C₂H₅ | —C₂H₅ |
| 77. | —Cl | —Cl | —C₂H₅ | —Cl | —C₂H₅ | —CH₂—C(CH₃)=CH₂ |
| 78. | —Cl | —Cl | —CH₃ | —OCH₃ | —CH₃ | —CH₃ |
| 79. | —Cl | —Br | —CH₃ | —OCH₃ | —CH₃ | —C₂H₅ |
| 80. | —Cl | —Cl | —CH₃ | —OC₂H₅ | —C₂H₅ | —C₂H₅ |
| 81. | —Br | —Br | —C₂H₅ | —OC₂H₅ | —C₂H₅ | —C₂H₅ |
| 82. | —Cl | —Br | —CH₃ | —OC₃H₇(iso) | —CH₃ | —CH₃ |
| 83. | —Cl | —Cl | —CH₃ | —OC₄H₉(n) | —C₂H₅ | —C₂H₅ |
| 84. | —Cl | —Cl | —C₄H₉(sec.) | —OCH₃ | —CH₃ | —CH₃ |
| 85. | —Cl | —H | —CH₃ | —OCH₃ | —C₂H₅ | —CH₂—CH=CH₂ |
| 86. | —Cl | —Br | —CH₃ | —OCH₃ | —C₂H₅ | —C₄H₉(iso) |
| 87. | —Cl | —Cl | —CH₃ | —O—CH₂—CH=CH₂ | —C₂H₅ | —C₂H₅ |
| 88. | —Br | —Br | —C₂H₅ | —O—CH₂—CH=CH₂ | —CH₃ | —CH₃ |
| 89. | —Cl | —H | —CH₃ | —H | —C₂H₅ | —C₂H₅ |
| 90. | —Cl | —H | —CH₃ | —CH₃ | —C₂H₅ | —C₂H₅ |
| 91. | —Cl | —H | —CH₃ | —OCH₃ | —C₂H₅ | —C₂H₅ |
| 92. | —Cl | —Br | —CH₃ | —H | —C₂H₅ | —C₂H₅ |
| 93. | —Cl | —Br | —CH₃ | —CH₃ | —C₂H₅ | —C₂H₅ |
| 94. | —Cl | —Br | —CH₃ | —OCH₃ | —C₂H₅ | —C₂H₅ |
| 95. | —Br | —Br | —CH₃ | —H | —C₂H₅ | —C₂H₅ |
| 96. | —Br | —Br | —CH₃ | —CH₃ | —C₂H₅ | —C₂H₅ |
| 97. | —Br | —Br | —CH₃ | —OCH₃ | —C₂H₅ | —C₂H₅ |
| 98. | —CN | —H | —CH₃ | —H | —C₂H₅ | —C₂H₅ |
| 99. | —CN | —H | —CH₃ | —CH₃ | —C₂H₅ | —C₂H₅ |
| 100. | —CN | —H | —CH₃ | —OCH₃ | —C₂H₅ | —C₂H₅ |
| 101. | —CN | —H | —CH₃ | —H | —C₂H₅ | —CH₂—CH=CH₂ |
| 102. | —CN | —H | —CH₃ | —H | —C₄H₉(n) | —C₄H₉(n) |
| 103. | —CN | —H | —C₂H₅ | —CH₃ | —C₃H₇(n) | —C₃H₇(n) |
| 104. | —CN | —H | —CH=CH₂ | —H | —CH₃ | —CH₃ |
| 105. | —CN | —Cl | —CH₃ | —H | —C₂H₅ | —C₂H₅ |
| 106. | —CN | —Cl | —CH₃ | —CH₃ | —C₂H₅ | —C₂H₅ |
| 107. | —CN | —Cl | —CH₃ | —OCH₃ | —C₂H₅ | —C₂H₅ |
| 108. | —CN | —Br | —CH₃ | —H | —C₂H₅ | —C₂H₅ |
| 109. | —CN | —Br | —OC₂H₅ | —H | —C₂H₅ | —C₂H₅ |
| 110. | —NO₂ | —H | —CH₃ | —H | —C₂H₅ | —C₂H₅ |
| 111. | —NO₂ | —H | —CH₃ | —CH₃ | —C₂H₅ | —C₂H₅ |
| 112. | —NO₂ | —H | —CH₃ | —OCH₃ | —C₂H₅ | —C₂H₅ |
| 113. | —NO₂ | —H | —CH₃ | —H | —CH₂—CH=CH₂ | —CH₂—CH=CH₂ |
| 114. | —NO₂ | —H | —C₂H₅ | —H | —CH₃ | —CH₃ |
| 115. | —NO₂ | —H | —CH₃ | —Cl | —C₂H₅ | —C₂H₅ |
| 116. | —NO₂ | —H | —CH₃ | —H | —C₂H₅ | —C₄H₉(tert.) |
| 117. | —NO₂ | —H | —CH₃ | —H | —C₂H₅ | —CH₂—CH=CH₃ |
| 118. | —NO₂ | —Cl | —CH₃ | —H | —C₂H₅ | —C₂H₅ |
| 119. | —NO₂ | —Cl | —CH₃ | —OCH₃ | —C₂H₅ | —C₂H₅ |
| 120. | —NO₂ | —Br | —CH₃ | —H | —C₂H₅ | —C₂H₅ |
| 121. | —NO₂ | —Br | —CH₃ | —CH₃ | —C₂H₅ | —C₂H₅ |

Obviously many modifications and variations of the present invention are possible in the light of the above teachings. It is, therefore, to be understood that within the scope of the appended claims the invention may be practiced otherwise than as specifically described.

What is claimed is:

1. In the process of dyeing a polyester fabric with a dispersion of a water-insoluble dye, the improvement wherein said dye is:

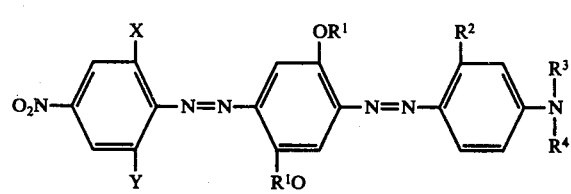

in which $R^1$, $R^3$ and $R^4$ can be the same or different lower alkyl or lower alkenyl, $R^2$ is hydrogen, halogen, lower alkyl, lower alkoxy or lower alkenoxy, X is hydrogen, chlorine, bromine, nitrile or nitro, and Y is hydrogen, chlorine or bromine.

2. The process of claim 1 in which X and Y are each hydrogen.

3. The process of claim 2 in which $R^1$ is methyl, $R^2$ is hydrogen, and $R^3$ and $R^4$ are each ethyl.

4. The process of claim 2 in which $R^1$ and $R^2$ are each methyl, and $R^3$ and $R^4$ are each ethyl.

5. The process of claim 1 in which $R^1$ is methyl and $R^3$ and $R^4$ are each ethyl.

6. The process of claim 5 in which $R^2$ is methyl.

7. The process of claim 5 in which $R^2$ is hydrogen.

8. The process of claim 5 in which $R^2$ is methoxy.

9. The process of claim 5 in which X is chlorine.

10. The process of claim 5 in which X is bromine.

11. The process of claim 5 in which X is nitrile.

12. The process of claim 5 in which X is nitro.

13. The process of claim 5 in which X and Y are each chlorine.

* * * * *

UNITED STATES PATENT AND TRADEMARK OFFICE
CERTIFICATE OF CORRECTION

PATENT NO. : 4,069,012
DATED : JANUARY 17, 1978
INVENTOR(S) : HEINRICH ET AL

It is certified that error appears in the above-identified patent and that said Letters Patent are hereby corrected as shown below:

In the Abstract, that portion of the formula reading

" 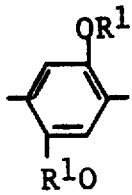 "    should read --   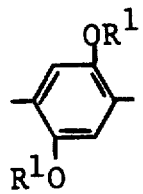   --.

Col. 7, line 55, "plyethylene" should read -- polyethylene --

Col. 10, line 32, "balckish" should read -- blackish --.

Claim 1, that portion of the formula reading

UNITED STATES PATENT AND TRADEMARK OFFICE
CERTIFICATE OF CORRECTION

PATENT NO. : 4,069,012
DATED : JANUARY 17, 1978
INVENTOR(S) : HEINRICH ET AL

It is certified that error appears in the above-identified patent and that said Letters Patent are hereby corrected as shown below:

" 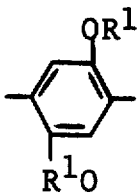 " should read -- 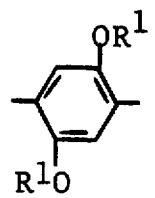 --.

Signed and Sealed this

Twentieth Day of June 1978

[SEAL]

Attest:

RUTH C. MASON
Attesting Officer

DONALD W. BANNER
Commissioner of Patents and Trademarks